G. G. LEWIS.
HOT AIR REGISTER.
APPLICATION FILED APR. 7, 1910.

966,842.

Patented Aug. 9, 1910.

WITNESSES
Chas. K. Davies
E. G. McCarthy

George Griffin Lewis
INVENTOR
by
Attorney

UNITED STATES PATENT OFFICE.

GEORGE GRIFFIN LEWIS, OF SYRACUSE, NEW YORK.

HOT-AIR REGISTER.

966,842.　　　　　Specification of Letters Patent.　　Patented Aug. 9, 1910.

Application filed April 7, 1910. Serial No. 554,029.

*To all whom it may concern:*

Be it known that I, GEORGE GRIFFIN LEWIS, a citizen of the United States, residing at Syracuse, in the county of Onondaga and State of New York, have invented new and useful Improvements in Hot-Air Registers, of which the following is a specification.

The present invention relates to registers for delivering heated air into rooms, and the like, and the primary object is to provide novel, simple and effective means for maintaining the air at all times in properly moistened condition.

The preferred form of construction is illustrated in the accompanying drawings, wherein:—

Figure 1:
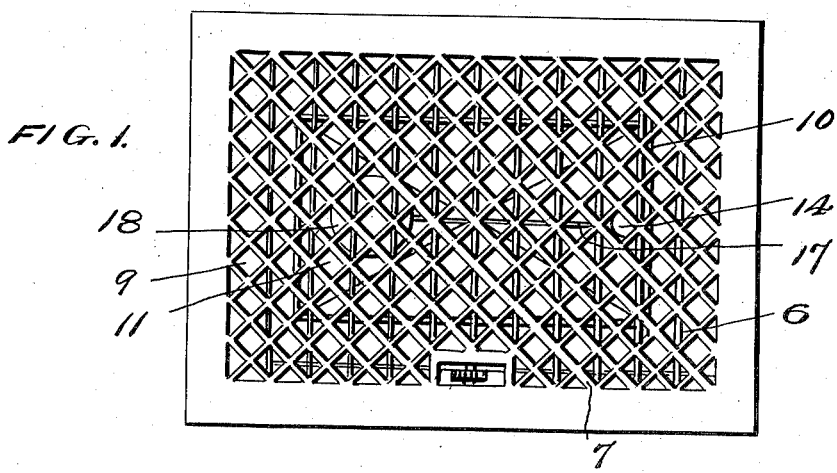
Figure 2:
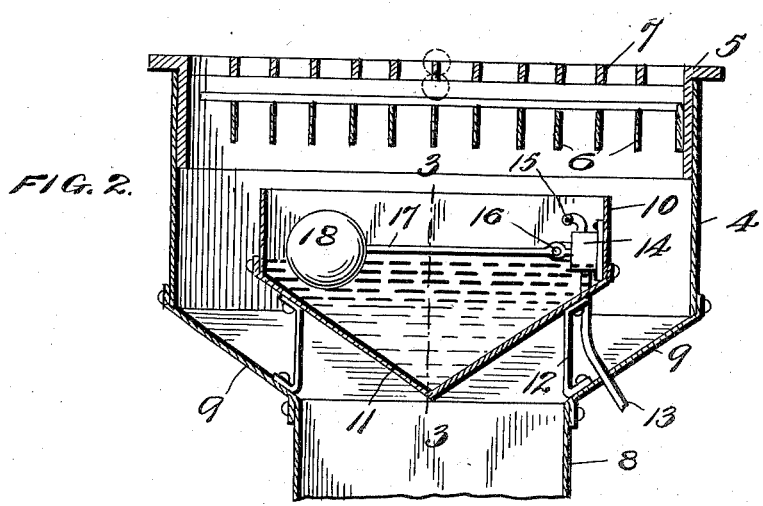
Figure 3:
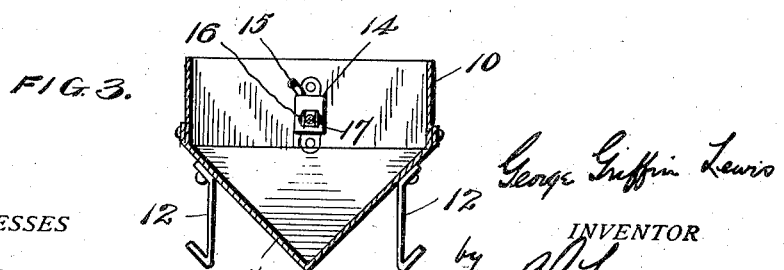

Figure 1 is a plan view of the register. Fig. 2 is a vertical sectional view therethrough. Fig. 3 is a sectional view on the line 3—3 of Fig. 2.

Similar reference numerals designate corresponding parts in all the figures of the drawings.

In the embodiment disclosed, a register casing 4 is employed that supports in its upper portion a frame 5. In this frame are located the usual controlling shutters 6 that are disposed beneath a grating 7. A hot air conducting pipe 8 is connected to the bottom of the casing and is of less cross sectional area than the same, said bottom preferably being inclined upwardly to the side walls of the casing, as shown at 9.

Located within the casing 4 is a reservoir 10 that is of greater cross sectional area than the heat conducting pipe 8 but of less cross sectional area than the casing 4. The reservoir 10 is arranged centrally within the casing and has a bottom 11 in the form of an inverted pyramid, said bottom thus tapering to a point centrally of the heat conducting pipe. A plurality of standards 12, secured to the bottom 9 of the casing and the bottom 11 of the reservoir, serve to support said reservoir in spaced relation to the bottom 9 and the side walls 4.

Water is supplied to the reservoir 10 through a suitable pipe 13 leading from any desired source, which pipe is connected to a valve casing 14 arranged within the reservoir and having a suitable delivery port, as 15. In this casing 14 is located any well known type of controlling valve, the same having a stem 16 to which is secured the swinging arm 17 of a float 18 arranged within the reservoir.

It is believed that the operation of the structure will be clear by reference to Fig. 2. The reservoir has an open top disposed directly below the grating 7 of the register, and the heated air as it passes upwardly through the pipe 8 will be deflected outwardly in all directions into the casing 4; thence passing alongside the reservoir 10, will be discharged upwardly through the register grating. When the shutters 6 are opened, the air will of course cause the evaporation of the water in the reservoir and therefore the air as it passes from the register will be in properly moistened condition. As the level of the water in the reservoir falls, due to the evaporation thereof, the float 18 will of course fall with it, and thus open the controlling valve, allowing a fresh supply. As a consequence, a proper supply of water will at all times be maintained in the reservoir.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

In apparatus of the character set forth, the combination with a hot air register casing having a downwardly tapered bottom, and means in the upper portion of the same for controlling the passage of the air therethrough, of a hot air conducting pipe connected to the central portion of the downwardly tapered bottom of the casing and of less cross sectional area than the same, a water reservoir supported in the casing over the pipe and being of greater cross sectional area than said pipe, said water reservoir having a downwardly tapered bottom corresponding substantially to the taper of the casing bottom and spaced therefrom, standards secured to the two bottoms for supporting the reservoir in spaced relation to the bottom of the casing and to the side walls thereof, a water supply pipe connected to the reservoir and bridging the space in the casing, a valve in said pipe, and an automatic controlling float connected to the valve and located in the reservoir.

In testimony whereof I have hereunto set my hand in presence of two subscribing witnesses.

GEORGE GRIFFIN LEWIS.

Witnesses:
E. L. PIATZ,
JOHN W. CHURCH.